United States Patent
Opawale

(10) Patent No.: US 10,888,805 B2
(45) Date of Patent: Jan. 12, 2021

(54) HEAVY SOLIDS SEPARATOR

(71) Applicant: FMC Kongsberg Subsea AS, Kongsberg (NO)

(72) Inventor: Adekunle Olutayo Opawale, Arnhem (NL)

(73) Assignee: FMC Kongsberg Subsea AS, Kongsberg (NO)

( * ) Notice: Subject to any disclaimer, the term of this patent is extended or adjusted under 35 U.S.C. 154(b) by 14 days.

(21) Appl. No.: 15/774,993

(22) PCT Filed: Nov. 7, 2016

(86) PCT No.: PCT/EP2016/076772
§ 371 (c)(1),
(2) Date: May 9, 2018

(87) PCT Pub. No.: WO2017/080936
PCT Pub. Date: May 18, 2017

(65) Prior Publication Data
US 2018/0326326 A1  Nov. 15, 2018

(30) Foreign Application Priority Data

Nov. 9, 2015 (NO) .................................... 20151521

(51) Int. Cl.
| | | |
|---|---|---|
| *B01D 21/26* | (2006.01) | |
| *B04C 5/081* | (2006.01) | |
| *B04C 5/13* | (2006.01) | |
| *B04C 5/185* | (2006.01) | |
| *B04C 5/103* | (2006.01) | |
| *B04C 11/00* | (2006.01) | |

(52) U.S. Cl.
CPC ......... *B01D 21/267* (2013.01); *B01D 21/265* (2013.01); *B04C 5/081* (2013.01);
(Continued)

(58) Field of Classification Search
CPC ..... B04C 2009/004; B04C 5/081; B04C 5/13; B04C 5/185; B04C 5/181; B04C 5/187;
(Continued)

(56) References Cited

U.S. PATENT DOCUMENTS

| | | | | |
|---|---|---|---|---|
| 802,651 | A | * 10/1905 | Meadon | .................. B04C 5/081 |
| | | | | 209/22 |
| 1,919,653 | A | * 7/1933 | Hill | ........................... B04C 3/00 |
| | | | | 210/85 |

(Continued)

FOREIGN PATENT DOCUMENTS

| | | |
|---|---|---|
| GB | 2 136 325 A | 9/1984 |
| WO | WO 00/10719 A1 | 3/2000 |
| WO | WO 2014/108177 A1 | 7/2014 |

*Primary Examiner* — David C Mellon

(57) ABSTRACT

The present invention provides a heavy solids separator for separating solids from fluids, comprising a swirl-generating chamber (1) and a solids accumulation chamber (2), wherein the swirl-generating chamber (1) comprises an inlet (3), a solids outlet (4) and a fluid extraction pipe (5) arranged at the centerline (C) of the chamber (1), the inlet arranged at an upper part of the swirl-generating chamber, the solids outlet is fluidly connected to the solids accumulation chamber and arranged in the bottom of the swirl-generating chamber, and the fluid extraction pipe (5) has a fluid inlet (6,19) comprising an opening (6) arranged at the centerline of the fluid extraction pipe, the opening facing the solids outlet (4), and a fluid outlet (7) for extracting fluid out of the swirl-generating chamber; and the solids accumulation chamber (2) comprises a solids inlet (8) fluidly connected to the solids outlet (4) of the swirl-generating chamber, and a solids outlet (9) arranged in a lower part of the solids accumulation chamber; and at least parts of the swirl-generating chamber and the solids accumulation chamber are arranged in a cylindrical housing (12) comprising a funnel-shaped frustoconical element (13) delimiting at least a lower section of (Continued)

the swirl-generating chamber and an upper section of the solids accumulation chamber, the funnel-shaped frustoconical element has an upper opening (14) and a lower opening (15), the upper opening having a larger diameter than the lower opening; wherein the solids accumulation chamber (2) comprises a fluid outlet (10) arranged above the level of the solids inlet (8) and fluidly connected downstream of the fluid outlet (7) of the fluid extraction pipe.

24 Claims, 6 Drawing Sheets

(52) U.S. Cl.
CPC ............... B04C 5/103 (2013.01); B04C 5/13 (2013.01); B04C 5/185 (2013.01); B04C 11/00 (2013.01)

(58) Field of Classification Search
CPC .. B04C 5/14; B04C 5/10; B04C 5/103; B04C 7/00; B04C 11/00; B04C 5/08; B01D 21/26; B01D 21/265; B01D 21/267
USPC ........................................................ 210/512.1
See application file for complete search history.

(56) References Cited

U.S. PATENT DOCUMENTS

| | | | |
|---|---|---|---|
| 2,347,731 A * | 5/1944 | Boivie | B04C 5/081 209/722 |
| 2,788,087 A | 4/1957 | Lenehan | |
| 2,983,384 A * | 5/1961 | Winslow | B01D 29/21 210/132 |
| 3,061,098 A * | 10/1962 | Brezinski | B01D 46/24 209/17 |
| 3,204,772 A * | 9/1965 | Ruxton | E21B 43/34 210/512.1 |
| 3,513,642 A * | 5/1970 | Cornett | B01D 50/00 55/399 |
| 3,529,405 A * | 9/1970 | Clifford | B04C 5/14 96/195 |
| 3,898,068 A * | 8/1975 | McNeil | B01D 45/12 55/426 |
| 3,959,139 A * | 5/1976 | El-Hindi | B04C 7/00 210/97 |
| 3,960,734 A * | 6/1976 | Zagorski | B04C 5/103 210/512.2 |
| 4,259,180 A * | 3/1981 | Surakka | B04C 5/13 209/732 |
| 4,596,586 A * | 6/1986 | Davies | B01D 19/0057 55/459.5 |
| 4,597,871 A | 7/1986 | Okouchi et al. | |
| 6,250,473 B1 * | 6/2001 | Golightley | B03B 5/623 209/158 |
| 6,440,317 B1 * | 8/2002 | Koethe | B01D 17/0217 210/774 |
| 2008/0179227 A1 * | 7/2008 | Saito | B01D 19/0042 210/109 |
| 2011/0185894 A1 | 8/2011 | Olsson | |
| 2015/0075124 A1 | 3/2015 | Guerry et al. | |

* cited by examiner

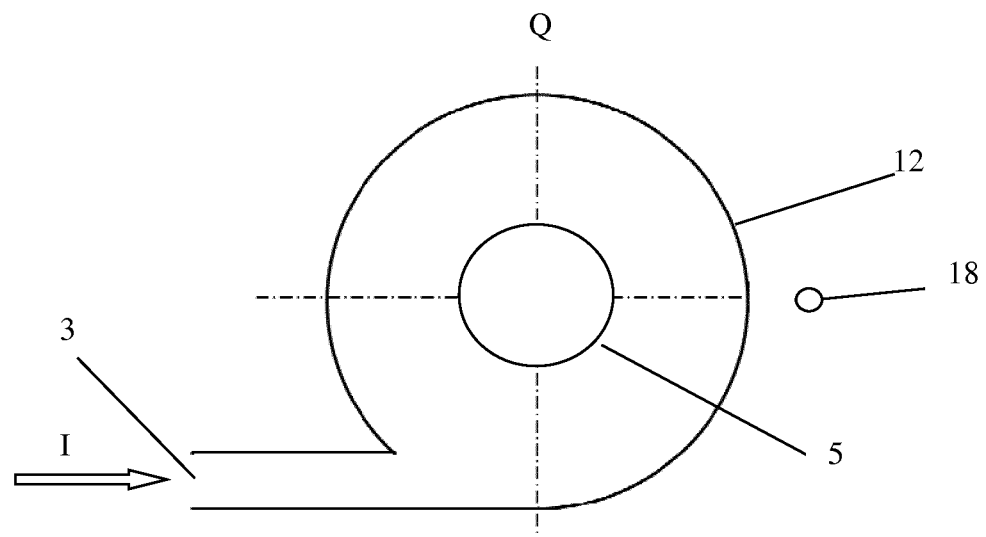
Fig. 2a (A-A)
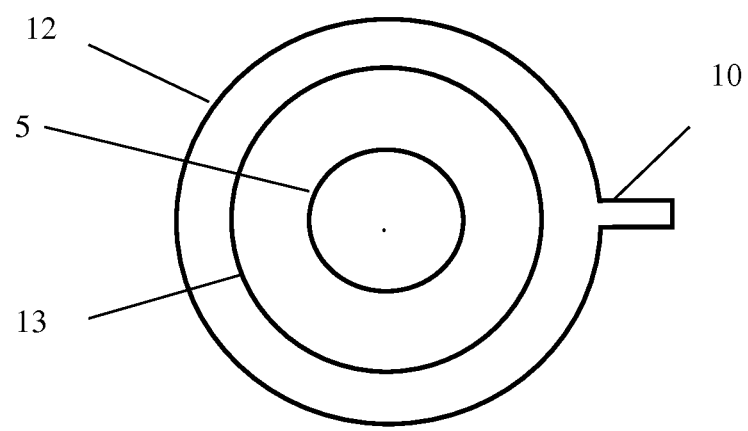
Fig. 2b (B-B)

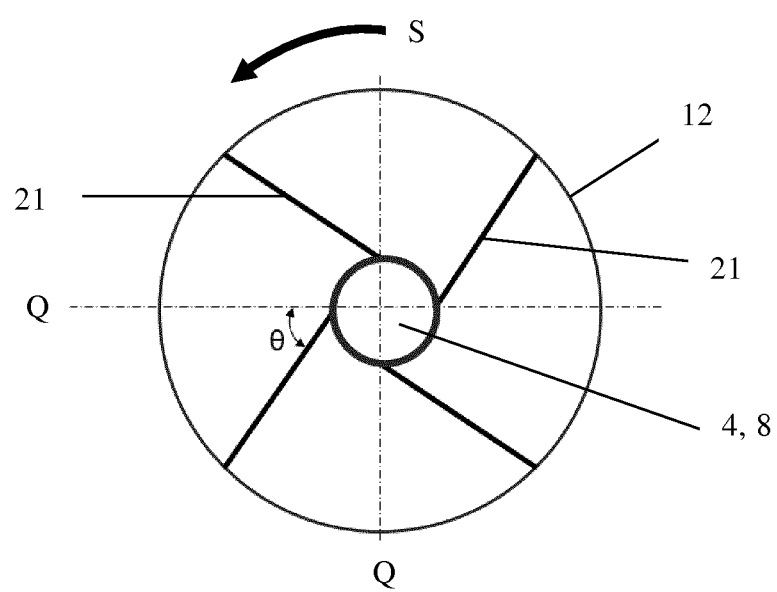
Fig. 2c (C-C)

HEAVY SOLIDS SEPARATOR

FIELD OF THE INVENTION

The present invention relates to the field of separators, and more particularly cyclonic separators for separating solid particles from a single or multiphase stream, where the stream has high solids load with varying particle types, densities and sizes.

BACKGROUND

Hydrocarbon production often comprises a single or multiphase stream having high solids content, especially during post-reservoir fracturing flow-back, coiled tubing cleanup, sand cleaning, well start-up operation, underbalanced drilling, well stimulations and well intervention. The solids content may be up to 30% by volume, with varying densities between 1200 kg/m3 to 4000 kg/m3 and particle sizes up to 8 cm. Such slurry streams may also be produced as slugs. Such solids also include formation sand particles, proppants, plugs, parts made of composite materials and steel etc. Operators have experienced frequent wear of production equipment, clogging of flowlines and accumulation in production vessels, resulting in huge operational costs, safety risks, and expensive operational downtime. To handle such product streams, a combination of a plug catcher and a sand trap may be used, but such solution results in high equipment weight and large footprint, in addition to high capital and operational costs.

There is presently no single separator able to handle production streams with such high solids concentration and composition.

Thus, based on the prior art there is a need for a solids separator able to handle a production fluid stream comprising large amounts of solids of various particle sizes and types, as well as situations where these particles may be arriving as slugs.

SUMMARY OF THE INVENTION

The heavy solids separator according to the invention is a compact vessel based cyclonic solids separator, built with efficient internal configuration for handling high solids contents, slugs and large particles, and can be installed immediately downstream of the wellhead, as a permanently installed facility or as a temporary well service tool.

The invention is defined in the attached claims, and in the following:

In a first aspect, the present invention provide a heavy solids separator for separating solids from fluids, comprising a swirl-generating chamber and a solids accumulation chamber, wherein the swirl-generating chamber comprises an inlet, a solids outlet and a fluid extraction pipe arranged at the centerline (C) of the swirl-generating chamber, the fluid inlet arranged at an upper part of the swirl-generating chamber, the solids outlet is fluidly connected to the solids accumulation chamber and arranged in the bottom of the swirl-generating chamber, and the fluid extraction pipe has a fluid inlet comprising an opening arranged at the centerline of the fluid extraction pipe, the opening facing the solids outlet, and a fluid outlet for extracting fluid out of the swirl-generating chamber; and the solids accumulation chamber comprises a solids inlet fluidly connected to the solids outlet of the swirl-generating chamber, and a solids outlet arranged in a lower part of the solids accumulation chamber; and at least parts of the swirl-generating chamber and the solids accumulation chamber are arranged in a cylindrical housing comprising a funnel-shaped frustoconical element delimiting at least a lower section of the swirl-generating chamber and an upper section of the solids accumulation chamber, the funnel-shaped frustoconical element has an upper opening and a lower opening, the upper opening having a larger diameter than the lower opening;

wherein the solids accumulation chamber comprises a fluid outlet arranged above the level of the solids inlet and fluidly connected downstream of the fluid outlet of the fluid extraction pipe.

The heavy solids separator for separating solids from fluids provides a product fluid flow. The product fluid flow has a minimal or no solids content.

In one embodiment of the heavy solids separator, the fluid outlet of the solids accumulation chamber is fluidly connected downstream of the fluid outlet of the fluid extraction pipe by a fluid bypass pipe comprising a valve for controlling a flow split ratio of a fluid exiting the fluid outlet of the fluid extraction pipe and a fluid exiting the fluid outlet of the solids accumulation chamber.

In a further embodiment of the heavy solids separator, the fluid outlet in the solids accumulation chamber is fluidly connected downstream of the fluid outlet of the fluid extraction pipe, such that fluids exiting the fluid outlet in the solids accumulation chamber and fluids exiting the fluid outlet of the fluid extraction pipe are combined into a common product fluid flow during use.

In yet another embodiment of the heavy solids separator, the fluid outlet in the solids accumulation chamber and the outlet of the fluid extraction pipe are fluidly connected to a common product fluid flow pipe.

In one embodiment of the heavy solids separator, the upper opening of the funnel-shaped frustoconical element is arranged at a level below the fluid inlet of the swirl-generating chamber, and the lower opening of the funnel-shaped frustoconical element is arranged at the level of, or above, the solids outlet of the swirl-generating chamber.

In one embodiment of the heavy solids separator, the fluid outlet of the solids accumulation chamber is arranged at a level which is closer to the level of the upper opening than the level of the lower opening.

In one embodiment of the heavy solids separator, the fluid extraction pipe has a lower section having a frustoconical shape, the lower section comprises the fluid inlet of the fluid extraction pipe, and the opening of the fluid extraction pipe is arranged at the tapered end of the lower section. The circumference of the lower section tapers in the direction of the solids outlet of the swirl generating chamber.

In one embodiment, the fluid extraction pipe comprises an upper section consisting of a non-perforated cylindrical pipe. The opening of the fluid inlet of the fluid extraction pipe may be described as externally facing the solids outlet and internally facing the fluid outlet for extracting fluid out of the swirl-generating chamber.

In one embodiment, an inner wall of the swirl-generating chamber (or an upper section of an inner wall of the cylindrical housing) and an external surface of the upper section of the extraction pipe (i.e. the non-perforated cylindrical pipe) provide a cylindrical annular space. The cylindrical annular space fluidly connects the inlet of the swirl-generating chamber, the frustoconical annular space (described below) and the solids outlet of the swirl generating chamber.

In one embodiment of the heavy solids separator, the fluid inlet of the fluid extraction pipe comprises multiple perforations or slots arranged through the wall of the lower section.

In one embodiment of the heavy solids separator, the cone angle of the lower section and the cone angle of the funnel-shaped frustoconical element are substantially equal. Preferably, the lower section of the fluid extraction pipe and the funnel-shaped frustoconical element provide a frustoconical annular space in the swirl-generating chamber, preferably the annular space extends from the level of the upper opening of the funnel-shaped frustoconical element to the level of the opening of the fluid extraction pipe. The frustoconical annular space is an extension of the cylindrical annular space described above.

In one embodiment of the heavy solids separator, the multiple perforations or slots, arranged through the wall of the lower section, face the frustoconical annular space between the lower section of the fluid extraction pipe and the funnel-shaped frustoconical element.

In one embodiment of the heavy solids separator, the opening of the fluid inlet of the fluid extraction pipe is arranged at a level closer to the lower opening of the funnel-shaped frustoconical element than the upper opening.

In one embodiment of the heavy solids separator, the solids accumulation chamber comprises multiple anti-swirl plates arranged to prevent or reduce the swirl movement of a fluid and solids flow entering the solids accumulation chamber via its solids inlet.

In one embodiment of the heavy solids separator, the multiple anti-swirl plates are evenly spaced and arranged between the circumference of the solids inlet of the solids accumulation chamber and an inner surface of the cylindrical housing.

The anti-swirl plates are arranged at an angle within the range of 0-45 degrees in relation to a respective quadrant line (Q) on the transverse cross-sectional plane of the solids accumulation chamber, preferably at an angle of 45 degrees. The plane of the anti-swirl plates is arranged substantially perpendicular to the transverse cross-sectional plane of the solids accumulation chamber. The angle of the anti-swirl plates is such that the fluid flow is directed away from the solids inlet of the solids accumulation chamber.

In one embodiment of the heavy solids separator, the solids outlet of the solids accumulation chamber is closable and comprises a valve for intermittent or continuous removal of accumulated solids as a substantially thickened slurry, the slurry is removed to a pressurized container or atmospheric tank for solids disposal or sand cleaning. Alternatively, the solids outlet of the solids accumulation chamber is connected to the pressurized container or atmospheric tank, said container/tank comprising a closable solids outlet.

In one embodiment of the heavy solids separator, the swirl-generating chamber and the solids accumulation chamber are arranged in the cylindrical housing. The cylindrical housing may be comprised by multiple housing sections having different outer diameters.

In one embodiment of the heavy solids separator, the valve on the fluid bypass pipe is able to provide the flow split ratio in the range of 0 to 30%.

The flowrate of the fluid passing through the fluid bypass pipe (i.e. the bypass fluid) is controlled by a valve. By controlling said fluid flowrate, the slurry concentration (i.e. the concentration of solids in the fluid) entering the solids accumulation chamber is also controlled.

In a further embodiment of the heavy solids separator, the flowrate of the bypass fluid is controlled to maintain a homogenous upward fluid flow over the cross-sectional area of the solids accumulation chamber, such that the upward velocity of the upward fluid flow is sufficiently lower than the settling velocity of the largest solid particles to be separated.

The present application also discloses a cyclone separator having a swirl generating chamber, the swirl generating chamber comprises an inlet, a solids outlet and a fluid extraction pipe arranged at the centerline of the chamber,
  the fluid inlet is arranged at an upper part of the swirl-generating chamber;
  the solids outlet is arranged in the bottom of the swirl-generating chamber;
  the fluid extraction pipe comprises a fluid outlet for extracting fluid out of the swirl-generating chamber, and a lower section with a frustoconical shape, the lower section comprises a fluid inlet having an opening arranged at the tapered end of the lower section and multiple perforations or slots arranged through the wall of the lower section, the opening faces the solids outlet;
  the swirl-generating chamber is formed by a cylindrical housing having a funnel-shaped frustoconical lower end section, the tapered end of the lower end section of the housing comprises the solids outlet, and the cone angle of the lower section of the fluid extraction pipe and the cone angle of the lower end section of the housing are substantially equal, such that the lower section of the fluid extraction pipe and the lower end section of the housing provide a frustoconical annular space in the swirl-generating chamber.

In one embodiment of the cyclone separator, the fluid extraction pipe comprises an upper section constituted by a non-perforated cylindrical pipe. An external surface of the non-perforated cylindrical pipe and an inner surface of the cylindrical housing provide a cylindrical annular space in the swirl generating chamber. In the cylindrical annular space solids are made to separate out of a continuous single or multiphase stream (the stream entering the inlet of the swirl generating chamber), and will migrate towards the inner wall of the cylindrical housing and towards the solids outlet of the swirl generating chamber.

In one embodiment of the cyclone separator, the multiple perforations or slots face the frustoconical annular space.

The present application also discloses a solids accumulation container (or solids accumulation chamber) for fluid connection to a solids outlet of a cyclone separator, the solids accumulation container comprises a cylindrical housing having an upper end and a lower end, a solids inlet arranged in the upper end, a solids outlet arranged in the lower end, and multiple anti-swirl plates arranged to prevent or reduce the swirl movement of a fluid flow entering the solids accumulation container via its solids inlet.

In one embodiment, the solids accumulation container comprises a fluid outlet arranged at a level above the solids inlet of the solids accumulation container.

In one embodiment of the solids accumulation container, the multiple anti-swirl plates are evenly spaced and arranged between the circumference of the solids inlet of the solids accumulation container and an inner surface of the cylindrical housing.

Corresponding to the anti-swirl plates in the heavy solids separator, the anti-swirl plates are arranged at an angle within the range of 0-45 degrees in relation to a respective quadrant line (Q) on the transverse cross-sectional plane of the solids accumulation container, preferably at an angle of 45 degrees. The plane of the anti-swirl plates is arranged substantially perpendicular to the transverse cross-sectional plane of the solids accumulation container. The angle of the anti-swirl plates is such that the fluid flow is directed away from the solids inlet of the solids accumulation container.

The term "heavy solids separator" is in the present disclosure intended to mean a separator able to handle fluid flows having a solids content of up to 30% by volume, the solids having densities between 1200 kg/m3 to 4000 kg/m3 and particle sizes up to 8 cm.

SHORT DESCRIPTION OF THE DRAWINGS

The present invention is described in more detail by reference to the following drawings:

FIG. 1 is a schematic vertical cross-sectional side view of a separator according to the invention.

FIG. 2a-c are horizontal cross-sectional views of the separator of FIG. 1.

DETAILED DESCRIPTION OF THE INVENTION

Figure 1:
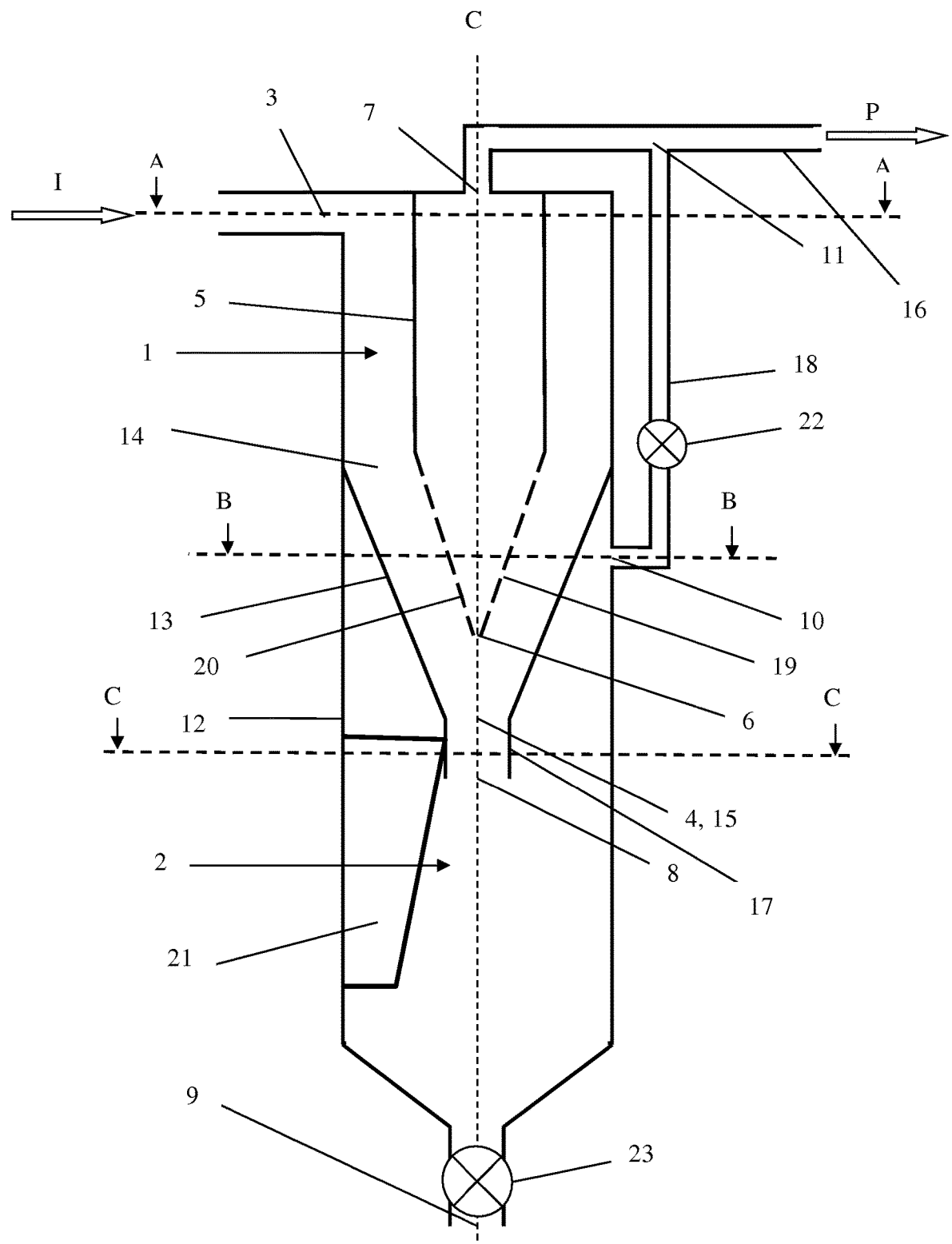

An embodiment of a solids separator according to the invention is shown in FIG. 1. The separator comprises two sections 1,2 (or chambers) fluidly connected by a passage or opening 4,8. The two sections are arranged in a cylindrical housing 12 having an upper end and a lower end, and separated by a funnel-shaped frustoconical element 13. The frustoconical funnel-shaped element has an upper opening 14 and a lower opening 15, wherein the diameter of the upper opening is larger than the diameter of the lower opening.

The first section 1 (i.e. swirl-generating chamber or cyclone separator) comprises an inlet 3 for a single or multiphase fluid flow I comprising solids, a fluid extraction pipe 5 and a solids outlet 4. The fluid extraction pipe comprises an upper cylindrical pipe and a lower frustoconical element 20. The outer wall of the upper cylindrical pipe and inner wall of the swirl generating chamber forms a cylindrical annular space. The inlet 3 is arranged such that the fluid flow I enters the cylindrical annular section tangentially to induce a swirling motion to the fluid around the fluid extraction pipe 5. Because of the swirling motion in the cylindrical annular section, solids are rapidly migrated out of the continuous single or multiphase fluid towards the inner wall of the swirl generating chamber or upper part of the cylindrical housing 12 and further flows out of the swirl generating chamber through the solids outlet 4. The cylindrical annular space has sufficient volume to receive plugs and slugs of solids without clogging/plugging. The extraction pipe 5 is arranged around the centerline of the first section and comprises a fluid inlet 6,19 and a fluid outlet 7. The extraction pipe 5 features a lower section 20 (or lower end section) having a frustoconical shape.

The lower section 20 comprises, or provides, the fluid inlet 6,19 having an opening 6 arranged at the centerline of the tapered end of the lower section and multiple perforations 19 arranged in the sidewall of the lower section. The perforations 19 may for instance be formed as circular openings or slots arranged perpendicular to, aligned with or angled with respect to the centerline of the lower section 20 (see FIG. 3 for examples of various embodiments of the lower section). During use, the multiple perforations/slots 19 act as a sieve allowing fluid to pass into the fluid extraction pipe, while larger size particles are excluded. Further, due to the increased pressure at the centerline of the first section, a fluid flow is directed back towards the tapered end of the lower section from the direction of the lower opening 15; the opening 6 prevents this back-flow from disrupting the flow conditions of the fluid swirl around the lower section. The fluid inlet 6,19 of the extraction pipe 5 is connected to the fluid outlet 7 of the extraction pipe 5 arranged at the upper end of the cylindrical housing 12, such that a fluid may be extracted out of the first section through said upper end. The cone angle of the lower section of the fluid extraction pipe and the cone angle of the funnel-shaped frustoconical element 13 are substantially equal, thus providing a conical annulus between the lower section and the funnel-shaped frustoconical element. The substantially equal cone angles allow the pressure balance to be maintained for the fluid flow through the conical annulus. Thus, the lower section of the fluid extraction pipe and the funnel-shaped frustoconical element provide a frustoconical or funnel-shaped annular space in the first section 1 of the separator. The solids outlet 4 of the first section 1 is comprised by the lower opening of the funnel-shaped frustoconical element 13.

The cylindrical annular space in the upper section of the swirl generating chamber fluidly connects the inlet 3 of the heavy solids separator and the frustoconical annular space in the lower section of the swirl generating element. The reduction in diameter of the funnel shaped frustoconical element from the upper opening 14 to the solids outlet 4 (or the lower opening 15) shown in FIG. 1, increases the swirling velocity of solids in the frustoconical annular space, making it difficult for solids to flow towards the perforations or slots 19.

The second section 2 (or solids accumulation chamber) has a solids inlet 8, a solids outlet 9 and a fluid outlet 10. The solids inlet 8 is fluidly connected to the solids outlet 4 of the first section; in this particular embodiment via a cylindrical element 17 arranged at the lower opening of the funnel-shaped frustoconical element 13. The cylindrical element 17 is not an essential feature, and in some embodiments the solids inlet 8 is merely the same opening as the solids outlet 4. The solids outlet 9 of the second section is closed during operation, but may be opened to discharge accumulated solids when needed.

The dimension/circumference of the solids inlet 8 is large enough to allow passage of solids and particles having sizes as described above, and due to the size of the solids inlet the swirl motion of a fluid/solids flow entering the second section 2 is not substantially/adequately diminished. To prevent or remove the swirl motion of the fluid/solids flow, anti-swirl plates 21 (preferably made in metal) are arranged in the second section 2. For illustrative purposes, only one of the anti-swirl plates 21 is shown in FIG. 1. The plates 21 are welded to the solids inlet 8 and the inner wall of the cylindrical housing 12. The anti-swirl plates 21 prevent the continuous swirling of a slurry flow (i.e. a mixture of solids and fluid) entering the second section via the solids inlet 8. By stopping the swirl motion, the amount of solids being entrained in the fluid exiting the fluid outlet 10 of the second section 2 is significantly reduced or prevented.

Each of the anti-swirl plates 21 is in the present embodiment arranged at an angle θ of 45 degrees in relation to a respective quadrant line (Q) on the transverse cross-sectional plane of the second section 2 (or the housing 12), see FIG. 2c. The plane of the anti-swirl plates is arranged substantially perpendicular to the transverse cross-sectional plane of the second section 2. The arrow (S) shows the direction of the fluid flow swirl in relation to the angle θ of the anti-swirl plates 21, i.e. the angle of the anti-swirl plates is such that the fluid flow is directed away from the solids inlet 8. Although the disclosed angle θ is advantageous, the anti-swirl plates may be arranged at any angle in the range of 0-45 degrees and still provide the effect of preventing or removing the swirl motion of the fluid/solids flow.

The fluid outlet 10 of the second section is arranged at a level above the level of the solids inlet 8 in the second section, and also above the level of the solids outlet 4 of the first section. The second section has an upper volume delimited by the outer surface of the funnel-shaped frustoconical element 13 and the cylindrical housing. Due to the shape of the funnel-shaped frustoconical element 13, the horizontal cross-sectional area of the upper volume is gradually decreased in the upward vertical direction. By having the fluid outlet 10 arranged above the level of the solids outlet 4 of the first section, i.e. such that fluid may be extracted from the upper volume of the second section, the amount of solids remaining entrained in the fluid is minimized.

Further, the fluid outlet 10 is fluidly connected to the pipe intersection 11 by the fluid bypass pipe 18. The fluid bypass pipe 18 comprises a valve 22 for controlling the flow ratio (or flow split ratio) between a fluid exiting the fluid outlet 7 of the fluid extraction pipe 5 and a fluid exiting the fluid outlet 10 of the second section 2. The pipe intersection is arranged downstream of the fluid outlet 7 of the fluid extraction pipe 5. Both fluid outlets are connected to the product fluid pipe 16 such that fluid flows exiting via the respective outlets are joined into a common product fluid flow P. The fluid outlet 10 provides an increased velocity to the fluid flow entering the second section via the solids outlet 4 of the first section. The increased velocity through solids outlet 4 is essential to reduce the concentration of slurry in the funnel shaped frustoconical element 13 and avoid, or at least minimize, the risk of clogging the solids outlet 4 of the first section. This is especially important when separating solids from a fluid flow, wherein the fluid flow may comprise up to 30% (v/v) of solids. The separator according to the present invention is able to handle such large amounts of solids even when they arrive as slugs and/or have particle sizes of up to 8 cm. The flowrate of fluid through outlet 10 is also controlled to maintain a homogenous upward fluid flow over the cross-sectional area of the second section 2 such that the upward velocity towards the outlet 10 is sufficiently lower than the settling velocity of the largest solid particles to be separated.

The cross-sectional area of the solids outlet 4 of the first section 1 (and the solids inlet 8 of the second section) is advantageously slightly larger than the cross-sectional area of the fluid inlet 3 of the first section to ensure that large size particles entering the first section are able to pass into the second section 2.

Figure 4:
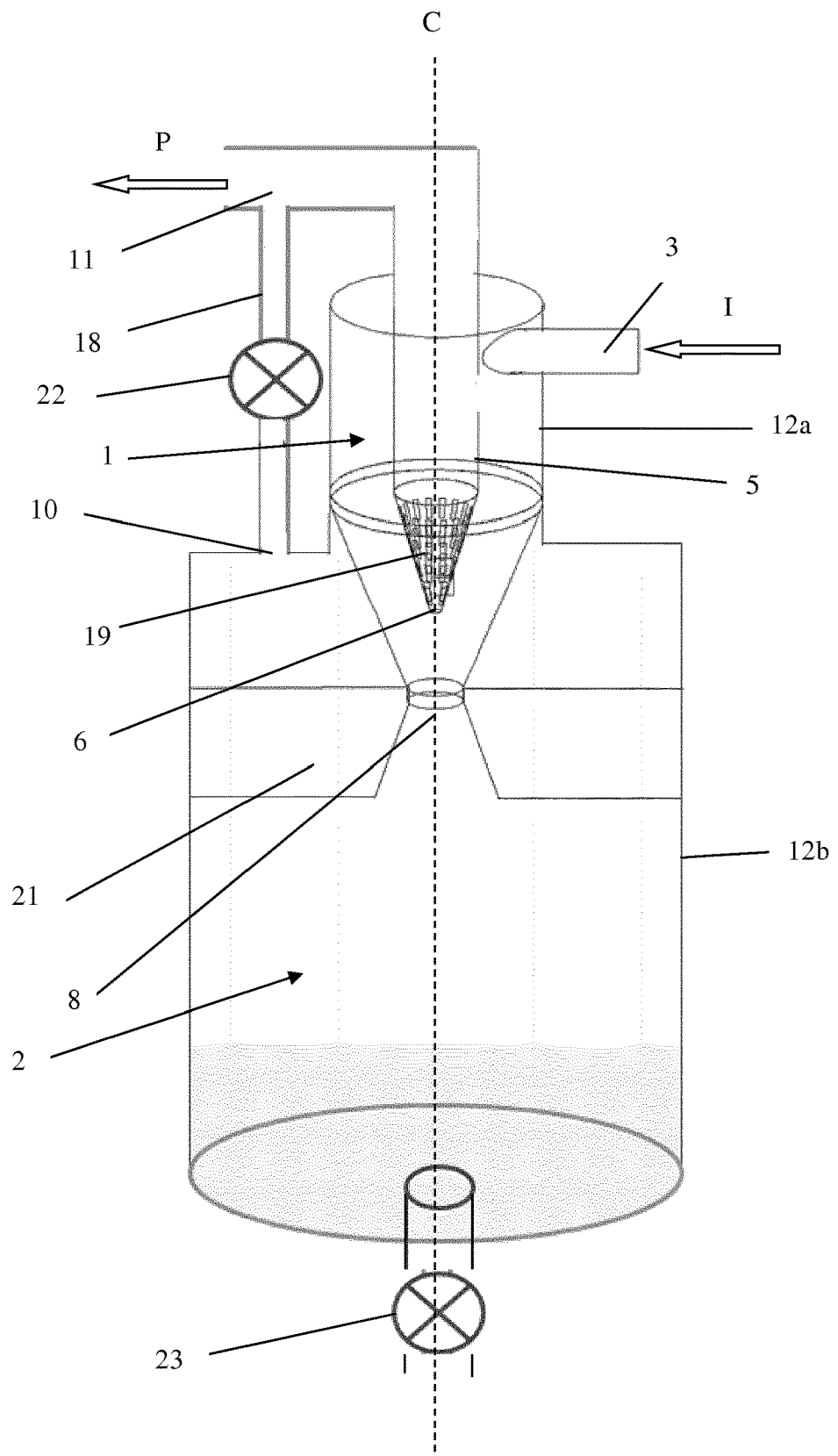
FIG. 4 is a schematic view of an embodiment of a separator according to the invention.

FIG. 4 shows a separator having a slightly different design compared to the separator of FIG. 1. The main difference between the two separators is the shape of the cylindrical housing 12. While the separator of FIG. 1 has a cylindrical housing with a constant diameter, the cylindrical housing 12 of the separator in FIG. 4 comprises an upper part 12a having a first diameter, the upper part delimiting at least a part of the first section 1, and a lower part 12b having a second diameter, the lower part delimiting the second section 2. In this embodiment the inner circumference of the upper part 12a has a diameter substantially equal to the diameter of upper opening 14 of the funnel-shaped frustoconical element 13. The diameter of the lower part 12b may be adapted to provide a solids accumulation chamber having a required/desired solids capacity. The solids capacity may be adapted independent of the required size of the first section 1. A further advantage of having a solids accumulation chamber having a larger diameter is that the upward velocity over the cross-sectional area of the solids accumulation chamber, towards the outlet 10, is reduced with the increased diameter when the fluid flowrate through the fluid outlet 10 is the same. The chance of entraining solids in the fluid flow through the fluid outlet 10 is thus reduced. However, the advantages obtained by increasing the size of the solids accumulation chamber must be weighed against the expense of increased cost, weight and footprint.

The further technical features of the separator in FIG. 4, and their corresponding reference numbers, are the same as shown for the separator in FIG. 1.

In use, a fluid flow (i.e. a hydrocarbon stream) comprising a substantial amount of solids, from a wellhead, enters the separator via the inlet 3 of the first section. The tangential arrangement of the inlet 3 forces the fluid flow into a swirling motion in the cylindrical annular space around the fluid extraction pipe 5, see FIG. 2a. Due to the swirling motion of the fluid, the solids migrate towards an inner surface of the first section 1, while a solids depleted fluid flow is extracted through the fluid inlet 6,19 of the fluid extraction pipe 5. Solids and an intended amount of fluid enter the second section 2 via the solids inlet 8. The solids accumulate in a bottom part of the second section 2, at the closable solids outlet 9, and an amount of fluid, equal to the intended amount that has entered the second section 2, exits via the fluid outlet 10 to be combined with the solids depleted fluid flow before exiting via the product fluid pipe 16. The fluid flow through the fluid outlet 10, defined by the flow split ratio, prevents clogging of the fluid connection between the first and the second section (i.e. the solids outlet 4, the solids inlet 8 and the cylindrical element 17). Further, the arrangement of the fluid outlet 10 above the lower opening 15 of the funnel-shaped frustoconical element ensures that a minimum of solids will be entrained in the remaining fluid flow exiting said fluid outlet.

As described above, a fluid entering the separator via the inlet 3 of the first section 1 will exit via two separate outlets, i.e. the fluid outlet 7 of the extraction pipe and the fluid outlet 10 of the second section 2. The exiting fluid is recombined at pipe intersection 11. The fluid exiting the fluid outlet 10 in the second section must first flow through the solids outlet 4 of the first section. This fluid flow substantially reduces the concentration of the solids flowing through the fluid connection between the first and the second section and creates additional drag on the solids while passing through said fluid connection. The fluid outlet 10 of the second section is fluidly connected downstream of the fluid outlet 7 of the extraction pipe 5 by a recirculating pipe 18 such that a desirable flow split ratio can be achieved and controlled by a valve installed on the recirculating pipe 18. The flow split ratio is optimized based on the solids concentration of the fluid flow entering the separator, with the aim of limiting the upward transport and entrainment of solids in the fluid flow exiting the fluid outlet 10. As shown in FIG. 4, in certain situations the diameter of the solids accumulation chamber 2 may be increased to reduce the magnitude of upward velocities, and further minimize risks of particle entrainments towards the fluids outlet 10. The flow split ratio may be in the range of 0 to 30%. For example, during the drill-out flow-back phase after fracturing, a phase characterized by high solids content, the valve 22, arranged on the recirculating pipe 18 connecting the fluid outlet 10 to the pipe intersection 11, may at first be fully open to provide a flow split ratio of up to 30%, and then gradually closed as the solids content is reduced. By controlling the flow split ratio with the valve 22, the amount of solids transported to the product flow P through the fluid outlet 10 is minimized. During coiled tubing cleanup, well start-up operation, underbalanced drilling, well stimulations and well intervention, a fixed valve position may be considered if sand content is expected to be fairly stable over time.

Figure 3:
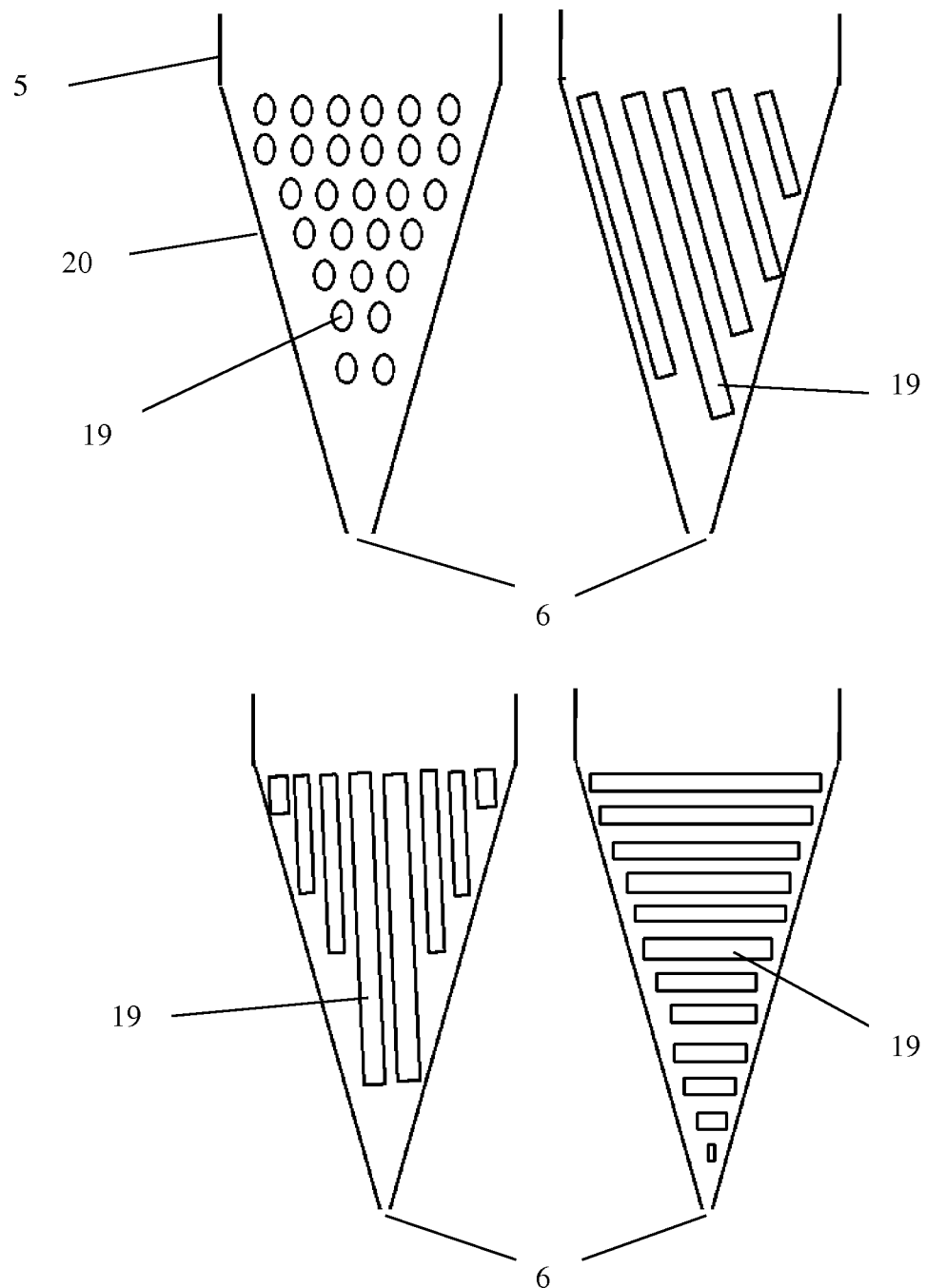
FIG. 3 show schematic views of various embodiments of perforations on the lower section of a fluid extraction pipe.
Figure 5:
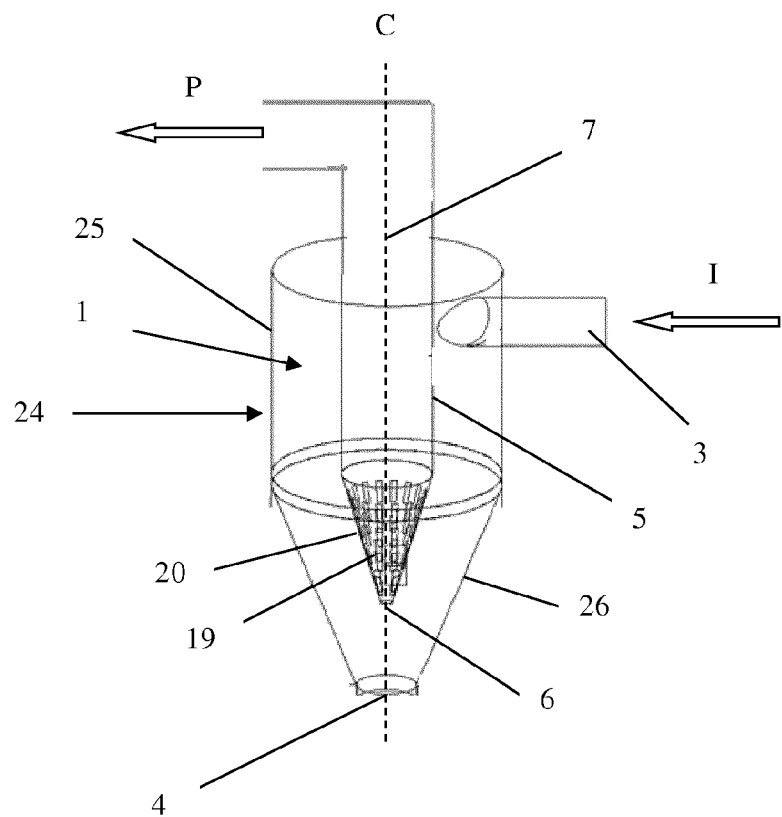
FIG. 5 is a schematic view of a cyclone separator.

A cyclone separator 24 comprising most of the features described in connection with the first section 1 (i.e. the swirl generating chamber) of the separator shown in FIGS. 1, 2a, 2b, 3 and 4, is disclosed in FIG. 5. The cyclone separator is described by reference to FIG. 5 and by use of the same reference numbers as used in FIGS. 1-4 for the corresponding technical features. The cyclone separator has a swirl generating chamber 1 which comprises an inlet 3, a solids outlet 4 and a fluid extraction pipe 5 arranged at the centerline C of the chamber. The inlet 3 is arranged in an upper part of the swirl-generating chamber and the solids outlet 4 is arranged in the bottom of the swirl-generating chamber. The fluid extraction pipe 5 comprises a fluid outlet 7 for extracting fluid out of the swirl-generating chamber, and a lower section 20 with a frustoconical shape. The lower section comprises a fluid inlet 6,19 having an opening 6 arranged at the tapered end of the lower section and facing the solids outlet 4, and multiple perforations or slots 19 arranged through the wall of the lower section. The swirl-generating chamber 1 is formed by a cylindrical housing 25 (i.e. corresponding in part to an upper part of the housing 12 of the separator of FIG. 1) having a frustoconical lower end section 26 (similar to the funnel-shaped frustoconical element 13 of the separator of FIG. 1, but being a lower end section of the housing 12 and not an internal part). The tapered end of the lower end section of the housing 12 (i.e. corresponding to the lower opening 15 of the funnel-shaped frustoconical element 13 of the separator of FIG. 1) comprises the solids outlet 4. The cone angle of the lower section 20 of the fluid extraction pipe and the cone angle of the lower end section 26 of the housing 12 are substantially equal, such that the lower section 20 of the fluid extraction pipe 5 and the lower end section 26 of the housing 12 provide a frustoconical annular space in the swirl-generating chamber. The multiple perforations or slots 19 of the extraction pipe face the frustoconical annular space. The feature of having the multiple perforations or slots 19 in the lower section of the fluid extraction pipe, in addition to the opening 6 at the tapered end, provides a cyclone separator wherein the pressure drop over the separator is minimized while the separation performance is maintained. Examples of perforations or slots suitable for use in the cyclone separator are shown in FIG. 3.

Figure 6:
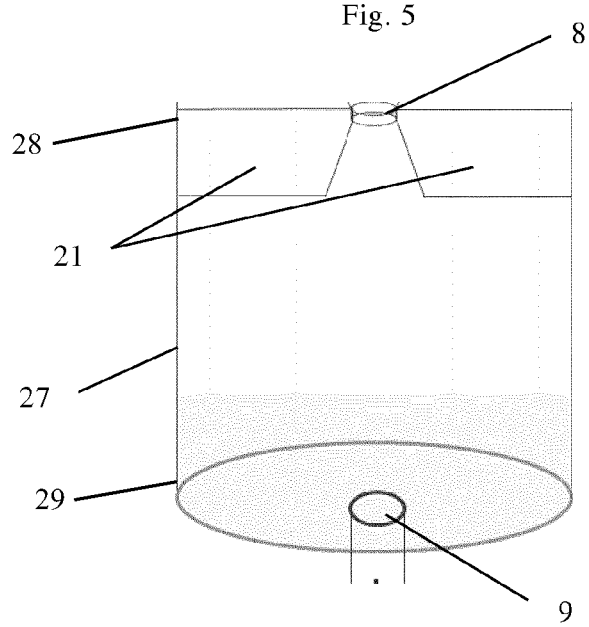
FIG. 6 is a schematic view of a solids accumulation container.

A solids accumulation container (or solids accumulation chamber) suitable for fluid connection to a solids outlet of a cyclone separator is shown in FIG. 6. Suitable cyclone separators for connection to the solids accumulation container are those providing a fluid flow which retains the swirl motion when exiting the solids outlet, for instance a cyclone separator as shown in FIG. 5. The solids accumulation container is described by reference to FIG. 6 and by use of the same reference numbers as used in FIGS. 1, 2 and 4 for the corresponding technical features. The solids accumulation container comprises a cylindrical housing 27 having an upper end 28 and a lower end 29, a solids inlet 8 arranged in the upper end, a solids outlet 9 arranged in the lower end, and multiple anti-swirl plates 21 arranged to prevent or reduce the swirl movement of a fluid flow entering the solids accumulation container via its solids inlet 8. The solids inlet 8 is suitable for connection to a solids outlet of a cyclone separator. The multiple anti-swirl plates 21 are evenly spaced and arranged between the circumference of the solids inlet 8 of the solids accumulation container and an inner surface of the cylindrical housing 27. Corresponding to the anti-swirl plates in the heavy solids separator, the anti-swirl plates are arranged at an angle within the range of 0-45 degrees in relation to a respective quadrant line (Q) on the transverse cross-sectional plane of the solids accumulation container, preferably at an angle of 45 degrees. The plane of the anti-swirl plates is arranged substantially perpendicular to the transverse cross-sectional plane of the solids accumulation container. The angle of the anti-swirl plates is such that the fluid flow is directed away from the solids inlet of the solids accumulation container.

The invention claimed is:

1. A heavy solids separator for separating solids from fluids, the separator comprising a swirl-generating chamber and a solids accumulation chamber, wherein:

the swirl-generating chamber comprises an inlet, a solids outlet and a fluid extraction pipe which is arranged at a centerline of the swirl-generating chamber, the inlet being arranged at an upper part of the swirl-generating chamber, the solids outlet being fluidly connected to the solids accumulation chamber and arranged in a bottom of the swirl-generating chamber, and the fluid extraction pipe having a fluid inlet comprising an opening which is arranged at a centerline of the fluid extraction pipe facing the solids outlet and a fluid outlet through which fluid exits the swirl-generating chamber; and the solids accumulation chamber comprises a solids inlet which is fluidly connected to the solids outlet of the swirl-generating chamber, and a solids outlet which is arranged in a lower part of the solids accumulation chamber; and at least parts of the swirl-generating chamber and the solids accumulation chamber are arranged in a cylindrical housing comprising a funnel-shaped frustoconical element delimiting at least a lower section of the swirl-generating chamber and an upper section of the solids accumulation chamber, the funnel-shaped frustoconical element having an upper opening and a lower opening, the upper opening having a larger diameter than the lower opening; and wherein the solids accumulation chamber comprises a fluid outlet which is arranged above a level of the solids inlet and is fluidly connected downstream of the fluid outlet of the fluid extraction pipe; and wherein during operation of the separator to separate solids from fluids, the fluids exit the solids accumulation chamber through the fluid outlet of the solids accumulation chamber; and wherein the fluid extraction pipe has a lower section having a frustoconical shape which converges radially inwardly from top to bottom, the lower section comprises the fluid inlet of the fluid extraction pipe, and the opening is arranged at a tapered bottom end of the lower section; and wherein the fluid inlet comprises multiple perforations or slots arranged through a wall of the lower section.

2. A separator according to claim 1, wherein the fluid outlet of the solids accumulation chamber is fluidly connected downstream of the fluid outlet of the fluid extraction pipe by a fluid bypass pipe.

3. A separator according to claim 2, wherein the fluid bypass pipe comprises a valve for controlling a flow split ratio of a fluid exiting the fluid outlet of the fluid extraction pipe and a fluid exiting the fluid outlet of the solids accumulation chamber.

4. A separator according to claim 3, wherein the valve is configured to provide a flow split ratio in the range of 0% to 30%.

5. A separator according to claim 1, wherein the fluid outlet of the solids accumulation chamber is fluidly connected downstream of the fluid outlet of the fluid extraction pipe such that fluids exiting the fluid outlet in the solids accumulation chamber and fluids exiting the fluid outlet of the fluid extraction pipe are combined into a common product fluid flow during use.

6. A separator according to claim 1, wherein the upper opening of the funnel-shaped frustoconical element is arranged at a level below the inlet of the swirl-generating chamber and the lower opening of the funnel-shaped frustoconical element is arranged at a level of or above the solids outlet of the swirl-generating chamber.

7. A separator according to claim 1, wherein the fluid outlet of the solids accumulation chamber is arranged at a level which is closer to a level of the upper opening than to a level of the lower opening.

8. A separator according to claim 1, wherein a cone angle of the lower section and a cone angle of the funnel-shaped frustoconical element are substantially equal, such that the lower section of the fluid extraction pipe and the funnel-shaped frustoconical element form a frustoconical annular space in the swirl-generating chamber which extends from approximately a level of the upper opening of the funnel-shaped frustoconical element to approximately a level of the opening of the fluid extraction pipe.

9. A separator according to claim 8, wherein the multiple perforations or slots face the frustoconical annular space.

10. A separator according to claim 1, wherein the opening of the fluid inlet of the fluid extraction pipe is arranged at a level closer to the lower opening of the funnel-shaped frustoconical element than to the upper opening of the funnel-shaped frustoconical element.

11. A separator according to claim 1, wherein the solids accumulation chamber comprises multiple anti-swirl plates arranged to prevent or reduce the swirl movement of a fluid flow entering the solids accumulation chamber via the solids inlet.

12. A separator according to claim 11, wherein the multiple anti-swirl plates are evenly spaced and arranged between a circumference of the solids inlet of the solids accumulation chamber and an inner surface of the cylindrical housing.

13. A heavy solids separator for separating solids from fluids, the separator comprising a swirl-generating chamber and a solids accumulation chamber, wherein:

the swirl-generating chamber comprises an inlet, a solids outlet and a fluid extraction pipe which is arranged at a centerline of the swirl-generating chamber, the inlet being arranged at an upper part of the swirl-generating chamber, the solids outlet being fluidly connected to the solids accumulation chamber and arranged in a bottom of the swirl-generating chamber, and the fluid extraction pipe having a fluid inlet comprising an opening which is arranged at a centerline of the fluid extraction pipe facing the solids outlet and a fluid outlet through which fluid exits the swirl-generating chamber; and the solids accumulation chamber comprises a solids inlet which is fluidly connected to the solids outlet of the swirl-generating chamber, and a solids outlet which is arranged in a lower part of the solids accumulation chamber; and at least parts of the swirl-generating chamber and the solids accumulation chamber are arranged in a cylindrical housing comprising a funnel-shaped frustoconical element delimiting at least a lower section of the swirl-generating chamber and an upper section of the solids accumulation chamber, the funnel-shaped frustoconical element having an upper opening and a lower opening, the upper opening having a larger diameter than the lower opening; and wherein the solids accumulation chamber comprises a fluid outlet which is arranged above a level of the solids inlet and is fluidly connected downstream of the fluid outlet of the fluid extraction pipe; and wherein the opening of the fluid inlet of the fluid extraction pipe is arranged at a level closer to the lower opening of the funnel-shaped frustoconical element than to the upper opening of the funnel-shaped frustoconical element.

14. A separator according to claim 13, wherein the fluid outlet of the solids accumulation chamber is fluidly connected downstream of the fluid outlet of the fluid extraction pipe by a fluid bypass pipe.

15. A separator according to claim 14, wherein the fluid bypass pipe comprises a valve for controlling a flow split ratio of a fluid exiting the fluid outlet of the fluid extraction pipe and a fluid exiting the fluid outlet of the solids accumulation chamber.

16. A separator according to claim 15, wherein the valve is configured to provide a flow split ratio in the range of 0% to 30%.

17. A separator according to claim 13, wherein the fluid outlet of the solids accumulation chamber is fluidly connected downstream of the fluid outlet of the fluid extraction pipe such that fluids exiting the fluid outlet in the solids accumulation chamber and fluids exiting the fluid outlet of the fluid extraction pipe are combined into a common product fluid flow during use.

18. A separator according to claim 13, wherein the upper opening of the funnel-shaped frustoconical element is arranged at a level below the inlet of the swirl-generating chamber and the lower opening of the funnel-shaped frustoconical element is arranged at a level of or above the solids outlet of the swirl-generating chamber.

19. A separator according to claim 13, wherein the fluid outlet of the solids accumulation chamber is arranged at a level which is closer to a level of the upper opening than to a level of the lower opening.

20. A separator according to claim 13, wherein the fluid inlet comprises multiple perforations or slots arranged through a wall of the lower section.

21. A separator according to claim 20, wherein a cone angle of the lower section and a cone angle of the funnel-shaped frustoconical element are substantially equal, such that the lower section of the fluid extraction pipe and the funnel-shaped frustoconical element form a frustoconical annular space in the swirl-generating chamber which extends from approximately a level of the upper opening of the funnel-shaped frustoconical element to approximately a level of the opening of the fluid extraction pipe.

22. A separator according to claim 21, wherein the multiple perforations or slots face the frustoconical annular space.

23. A separator according to claim 13, wherein the solids accumulation chamber comprises multiple anti-swirl plates arranged to prevent or reduce the swirl movement of a fluid flow entering the solids accumulation chamber via the solids inlet.

24. A separator according to claim 23, wherein the multiple anti-swirl plates are evenly spaced and arranged between a circumference of the solids inlet of the solids accumulation chamber and an inner surface of the cylindrical housing.

* * * * *